United States Patent [19]

Voegelin

[11] 3,997,766

[45] Dec. 14, 1976

[54] ROTARY INDEXING MECHANISM

[75] Inventor: Howard J. Voegelin, Cheshire, Conn.

[73] Assignee: Veeder Industries, Inc., Hartford, Conn.

[22] Filed: Sept. 26, 1974

[21] Appl. No.: 509,331

[52] U.S. Cl. .......................... 235/92 B; 235/92 R; 74/141; 310/21

[51] Int. Cl.[2] .......................................... G01L 5/12

[58] Field of Search ............ 235/92 B, 91 R, 92 C; 74/141, 138; 310/21

[56] References Cited

UNITED STATES PATENTS

| | | | |
|---|---|---|---|
| 1,553,131 | 9/1925 | Benedict | 74/141 |
| 2,954,491 | 9/1960 | Digirolamo | 310/21 |
| 3,543,707 | 12/1970 | Schweers | 74/138 |
| 3,667,306 | 6/1972 | Bush | 310/21 X |
| 3,747,848 | 7/1973 | Stothart | 235/92 C |
| 3,748,445 | 7/1973 | Burton | 235/92 C |

*Primary Examiner*—Joseph M. Thesz

*Attorney, Agent, or Firm*—Prutzman, Hayes, Kalb & Chilton

[57] ABSTRACT

Several embodiments of a rotary indexing mechanism having either an angularly reciprocable or rectilinearly reciprocable input, an output rotary friction drum and a one-way drive interconnect system between the input and friction drum comprising a drive line wrapped about the friction drum having one end connected to the reciprocable input and a line tensioning spring connected between the other end of the drive line and the reciprocable input and whereby the input is adapted to be actuated in one direction to draw the drive line from the friction drum and rotate the friction drum in one angular direction and to be actuated in the reverse direction by the tension spring to pay out the drive line to the friction drum and thereby uncouple the drive line from rotating the friction drum in the reverse angular direction.

1 Claim, 5 Drawing Figures

FIG. 4
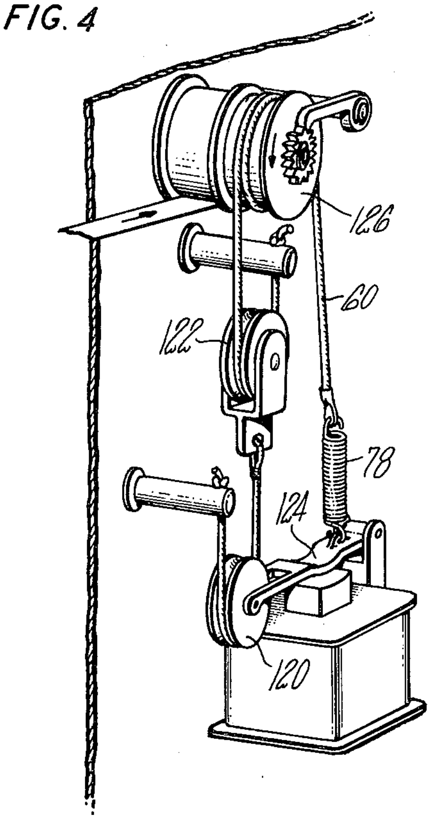
FIG. 5
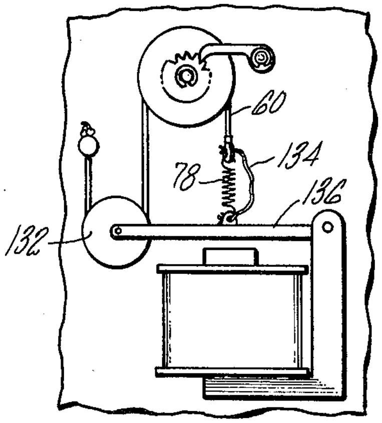
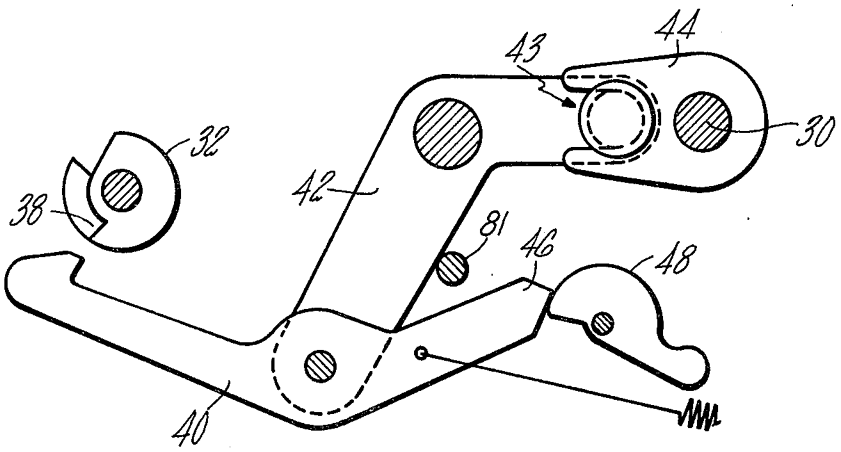
FIG. 2

ROTARY INDEXING MECHANISM

SUMMARY OF THE INVENTION

The present invention relates to a new and improved rotary indexing mechanism for angularly indexing an associated device.

It is a primary aim of the present invention to provide a new and improved rotary indexing mechanism which is selectively operable for angularly indexing an associated device in predetermined angular increments.

It is another aim of the present invention to provide a new and improved multiple purpose rotary indexing mechanism which may be used in a variety of applications and with either a rotary or rectilinear input.

It is another aim of the present invention to provide a new and improved rotary indexing mechanism for translating rectilinear or oscillating input motion into incremental rotary output motion.

It is a further aim of the present invention to provide a new and improved rotary indexing having a design mechanism permitting its input and output to be spaced substantially apart and the transmission of motion from its input to its output via a circuitous path.

It is another aim of the present invention to provide a new and improved rotary indexing mechanism for indexing the ink ribbon of a type wheel printer, typewriter or other printing mechanism.

It is a further aim of the present invention to provide a new and improved rotary indexing mechanism for selectively angularly indexing a rotary output with a continuously rotating shaft.

It is another aim of the present invention to provide a new and improved rotary indexing mechanism for angularly indexing a rotary counting device.

It is a further aim of the present invention to provide a new and improved electromagnetically operated rotary counting device.

It is another aim of the present invention to provide a new and improved rotary drive mechanism useful in small, low cost battery operated devices such as battery operated toys.

It is another aim of the present invention to provide a new and improved low cost rotary indexing mechanism which provides reliable operation over a long service free life and which may be easily installed, adjusted and repaired.

Other objects will be in part obvious and in part pointed out more in detail hereinafter.

A better understanding of the invention will be obtained from the following detailed description and the accompanying drawings of illustrative applications of the invention.

BRIEF DESCRIPTION OF THE DRAWINGS

In the drawings:

FIG. 2 is an enlarged side view, partly in section, of a portion of the ink ribbon drive mechanism;

FIG. 4 is a perspective view, partly broken away and partly in section, of a third embodiment of a rotary indexing mechanism of the present invention; and FIG. 5 is a side view, partly broken away, of a fourth embodiment of a rotary indexing mechanism of the present invention.

DESCRIPTION OF THE PREFERRED EMBODIMENTS

Figure 1:
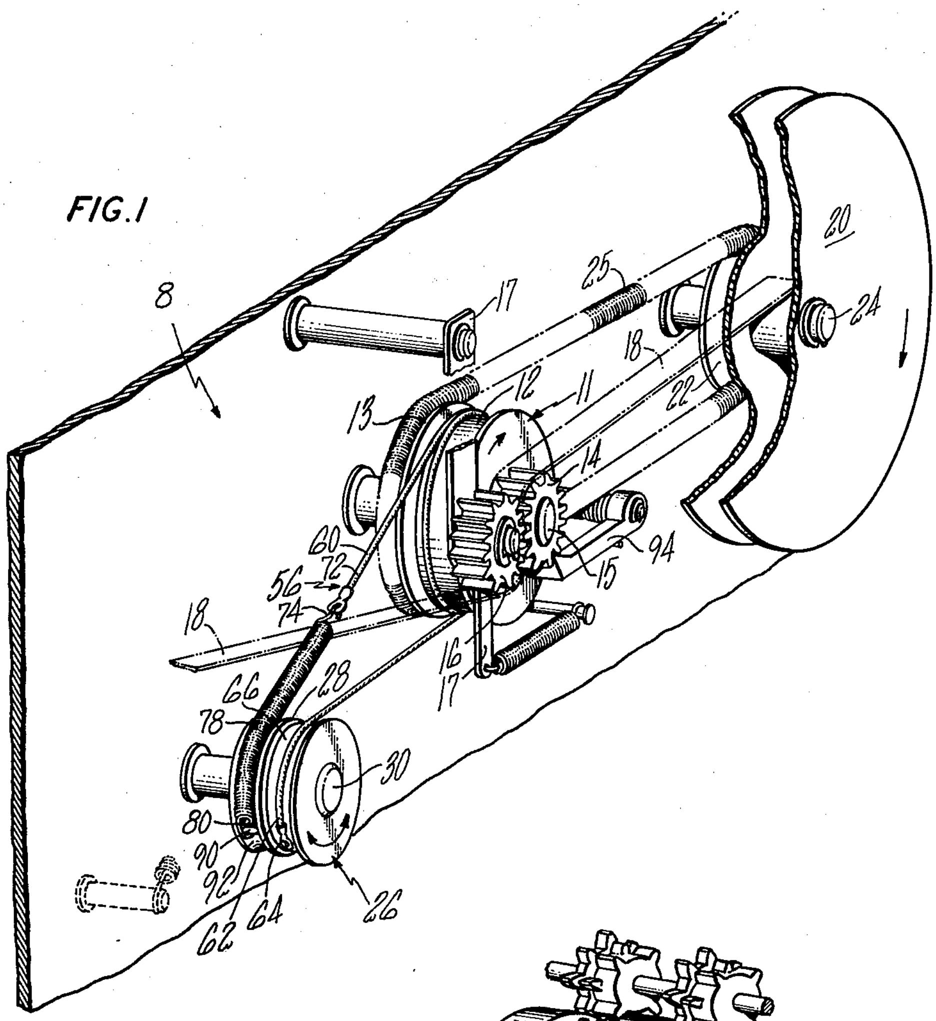
FIG. 1 is a perspective view, partly broken away and partly in section, of an ink ribbon drive mechanism incorporating a first embodiment of a rotary indexing mechanism of the present invention.

Referring now to the drawings in detail wherein like numerals represent like parts throughout the several figures, and referring particularly to FIGS. 1 and 2, there is shown an ink ribbon advancing mechanism 8 incorporating an embodiment of a rotary indexing mechanism of the present invention. The rotary indexing mechanism has a driven rotor 11 with a friction drum 12, a garter spring pulley 13 and an ink ribbon indexing gear 14. The components 12, 13 and 14 of the rotor 11 are rotatably mounted as a unit on a stub shaft 15. A back up pinion 16 is mounted on a spring biased lever 17 for cooperation with the gear 14 for advancing an intermediate ink ribbon 18 as the driven rotor 11 is angularly indexed, in the clockwise direction as viewed in FIG. 1. An ink ribbon take up reel 20 having a garter spring pulley 22 is rotatably mounted on a second stub shaft 24 for being driven via a garter spring 25 to take up the ink ribbon as it is advanced by the cooperating gears 14, 16.

A drive rotor 26 of the rotary indexing mechanism comprises a two section pulley 28 fixed onto a drive shaft 30 which, as hereinafter described, is connected to be selectively angularly driven through a drive stroke angle of approximately 36°, in the counterclockwise direction as viewed in FIG. 1.

The shown ribbon advancing mechanism 8 is designed for use with a print hammer actuating mechanism of the type described in U.S. Pat. No. 3,710,713 of Howard J. Voegelin dated Jan. 16, 1973 and entitled "Print Hammer Actuating Mechanism", and employs a continuously running drive ratchet shaft 32 with a drive shoulder 38 and a spring biased selectively releaseable drive pawl 40 connected for angularly driving the shaft 30, in the counterclockwise direction as viewed in FIG. 1, in conjunction with the operation of the print hammer drive pawls described in U.S. Pat. No. 3,710,713. More particularly, the releaseable drive pawl 40 is pivotally mounted on a pivotal lever 42 connected via a pin and slot connection 43 to a lever 44 affixed to the drive rotor shaft 30. The drive pawl 40 has a tail end 46 which cooperates with a control cam 48 (in the manner of the hammer actuating pawls in U.S. Pat. No. 3,710,713) to hold the drive pawl 40 out of engagement with the drive ratchet shaft 32. When the printer is operated by rotating the control cam 48 as described in U.S. Pat. No. 3,710,713, the drive pawl 40 is released (along with the hammer actuating pawls) for engagement with the ratchet shaft 32 for angularly driving the drive rotor shaft 30 through a drive stroke of approximately 36°.

A one-way drive interconnect system 56 comprising a flexible but preferably non-resilient drive line 60 is provided for connecting the drive rotor 26 to the driven rotor 11. The drive line 60 may for example be a braided line of dacron or other suitable synthetic material. One end 62 of the drive line 60 in connected directly to the drive rotor 26 by a suitable fastener 64 and the line 60 is mounted to extend from the fastener 64 around a drive pulley section 66 of the pulley 28 in an angular direction, in the clockwise direction as viewed in FIG. 1, opposite to the angular direction of the drive stroke of the drive rotor 26. The drive line 60 extends from the drive pulley 28 (via any intermediate guide pulleys, not shown, which may be desired) to the driven drum 12 and is wrapped about the driven drum 12 preferably more than 360° and for example to provide approximately one and one-half coils of line 60 about the drum 12 as shown in FIG. 1. The drive line 60 may be wrapped about the friction drum 12 in either angular direction in accordance with the desired angular direction of rotation of the rotor 11.

The other end 72 of the drive line 60 is connected to one end 74 of a suitable tension spring 78, and the other end 80 of the tension spring 78 is connected to the drive rotor 26 by a suitable fastener 90. Also, the tension spring 78 (or a suitable intermediate lead line, not shown, connected between the tension spring 78 and drive rotor 26) is wrapped about a pulley section 92 of the drive pulley 28 preferably to angularly extend from its end 80 in the same angular direction about the pulley 28 as the other end of the drive line 60.

As the drive rotor 26 is angularly driven through its drive stroke, in the counterclockwise direction as viewed in FIG. 1, the tension spring 78, in the preferred arrangement described, is elongated at a rate which is a function of the diameter of the pulley section 92 to tighten the drive line 60 and thereby increase its frictional engagement with the friction drum 12. At the same time, the other end of the taught line 60 is drawn from the friction drum 12 by the drive pulley 28 to rotate or index the drum 12, in the clockwise direction as viewed in FIG. 1, through the frictional engagement of the drive line 60 with the friction drum 12. At the completion of the drive stroke of the drive rotor 26, the drive rotor 26 is free to be returned through a return stroke to its initial angular position established by a stop 81 (FIG. 2). During the angular return stroke of the drive rotor 26, the tension on the drive line 60 is reduced and the line 60 is payed out to the friction drum 12 from the drive pulley 28 to effectively uncouple the drive line 60 from the friction drum 12 and permit the tension spring to take up the slack in the line 60 without effecting substantial reverse drive torque on the friction drum 12. Also, a pawl 94 is pivotally mounted to cooperate with the driven rotor gear 14 to prevent any reverse rotation of the driven rotor 11.

The tension spring 78 functions to bias the drive rotor 26 to its initial angular position and is used to perform the return or back stroke of the drive rotor 26 after its forward or drive stroke is completed. Thus, the tension spring 78 serves to (a) hold the drive line 60 under suitable tension during the drive stroke of the drive rotor 26 to provide for frictionally driving the driven rotor 11 with the drive line 60 (preferably without slippage), and (b) automatically return the drive rotor 26 and drive line 60 to their initial positions at the end of each drive stroke.

The tension spring end 80 may be wrapped about a drive pulley section 92 which has a diameter equal to or less or greater than the diameter of the drive line pulley section 66 to produce the desired line tension and/or drive rotor return bias. Alternatively, if desired the end 80 of the tension spring 78 may be connected to a fixed post as shown in part in broken lines in FIG. 1, or be wrapped about the pulley section 92 in the opposite direction in which event separate means would be provided for returning the drive rotor 26 to its initial position.

The rotary indexing mechanism is adapted to be readily designed for each particular application. The spring force, spring rate and relative diameters of the drive pulley section 66 and output drum 12 are established in accordance with the required output torque, the available input torque, and/or the desired or required input motion and output motion, it being seen that any reasonable mechanical ratio equal to or greater or less than one can be established by proper selection of the pulley and drum diameters. Also, if desired two or more of the drive systems can be connected between the drive shaft and driven rotor for (a) producing a greater output torque; or (b) indexing the driven rotor during the return stroke of the driven rotor (by wrapping the drive lines of the two interconnect systems 56 about the drive rotor pulley 66 in opposite angular directions).

Also, different suitable selectively engageable drive systems can be provided between the drive shaft and driven rotor for selectively establishing different drive ratios therebetween and/or different output torque levels. Accordingly, it can be seen that a unidirectional angular stepping mechanism is provided which is useful in numerous applications and which can be designed to provide adequate drive torque for each application.

Figure 3:
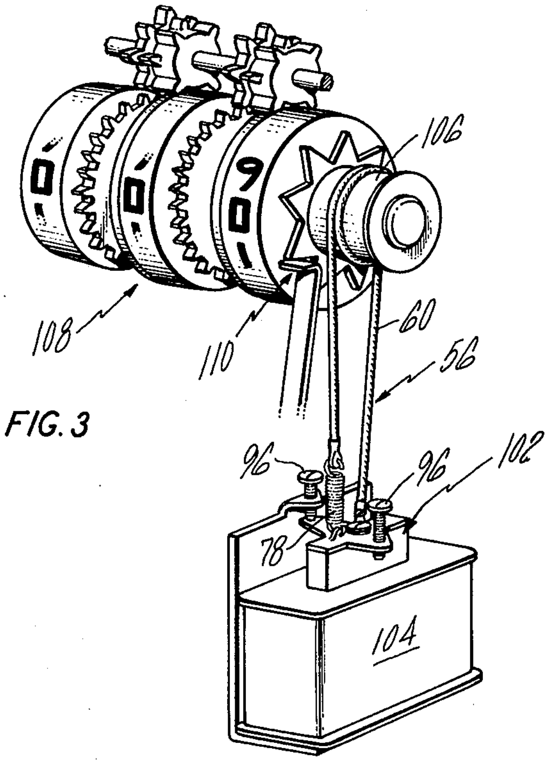
FIG. 3 is a perspective view, partly broken away and partly in section, of an electromagnetic counter incorporating a second embodiment of a rotary indexing mechanism of the present invention.

Referring to FIG. 3, there is shown a modified rotary indexing mechanism incorporating the present invention which comprises a drive member 102 mounted for rectilinear motion instead of rotary motion as in the embodiment of FIG. 1. The opposite ends of the one-way drive interconnect system 56 are connected to the rectilinear drive member 102 and the drive member 102 is driven through its drive stroke by an electromagnet 104, the drive member 102 being made of a ferromagnetic material and serving as the armature for the electromagnetic 104. When the electromagnet 104 is de-energized, the tension spring 78 of the one-way interconnect system 56 returns the armature 102 to its initial position. During the armature drive stroke, the driven rotor 106 is angularly indexed in the same manner as described with regard to the driven rotor 11 of the embodiment of FIG. 1. Thus, the embodiment of FIG. 3 illustrates an economical electromagnetic indexing mechanism which for example as shown in FIG. 3 is useful as a stepping device for stepping a conventional rotary counter 108 for accumulating a count.

In the counter application shown in FIG. 3, as well as in other applications where desired, a detent device 110 may be provided for accurately locating and/or retaining the driven rotor 106 in each indexed position. The detent device 110 also provides for preventing inadvertent reverse rotation of the driven rotor during the return stroke of the drive member. In addition, in the electromagnetic counter application (and in other applications where it is desired to step the driven rotor in precise increments) adjustable stop means 96 are preferably provided for accurately establishing the angular increment of rotation of the driven rotor and also if desired for establishing the operating tension of the tension spring 78.

Referring to FIG. 4, an electromagnetically operated rotary stepping mechanism is shown employing a pair of pulleys 120, 122 for increasing the mechanical advantage between a pivotal drive armature 124 and the driven rotor 126. A similar electromagnetically operated indexing mechanism is shown in FIG. 5 with however only a single pulley 132 for increasing the mechanical advantage. Also, FIG. 5 shows a stop line 134 between the drive line 60 and the pivotal armature 136 which provides a forward stop for limiting the drive stroke of the armature 136.

As will be apparent to persons skilled in the art, various modifications, adaptations and variations of the foregoing specific disclosure can be made without departing from the teachings of the present invention.

I claim:

1. A rotary indexing mechanism comprising a driven rotor with an integral coaxial external friction drum, a reciprocably mounted drive member reciprocable back and fourth through drive and return strokes thereof, a drive line wrapped about the friction drum for frictional engagement therewith and having a first end connected to the drive member for drawing the drive line from the friction drum during the drive stroke of the drive member and for paying out the drive line to the friction drum during the return stroke of the drive member, and a second end, drive line tensioning means connected to the second end of the drive line for maintaining the drive line in tension during the drive stroke of the drive member to effect rotation of the driven rotor in said one angular direction thereof through the frictional engagement of the drive line with the friction drum and to draw the drive line from the friction drum as the drive line is payed out thereto during the return stroke of the drive member, detent means for preventing rotation of the friction drum in the angular direction opposite to said one angular direction and for angularly detenting the friction drum in equiangularly spaced positions having a fixed angular increment therebetween, and drive member operating means selectively operable for actuating the drive member through a predetermined drive stroke for effecting rotation of the driven rotor in said one angular direction approximately said predetermined fixed angular increment, the drive member operating means comprising a rotatable drive ratchet shaft and selectively operable means for connecting the drive ratchet shaft for actuating the drive member through its drive stroke for effecting rotation of the driven rotor in said one angular direction, the drive member being angularly reciprocable and comprising a drive pulley, the drive line being wrapped about the drive pulley to draw the drive line from the friction drum and pay the drive line to the friction drum during angular drive and return strokes thereof respectively, and the selectively operable means comprising a lever connected for angularly reciprocating the drive pulley, a ratchet pawl pivoted on the lever and selectively engageable with the drive ratchet shaft for being actuated thereby for pivoting the lever and driving the drive pulley through its drive stroke, and means for selectively engaging the ratchet pawl with the drive ratchet shaft.

* * * * *